US009076994B2

(12) United States Patent
Bauer

(10) Patent No.: US 9,076,994 B2
(45) Date of Patent: Jul. 7, 2015

(54) METHOD FOR PRODUCING A LIQUID ELECTROLYTE BATTERY

(71) Applicant: IQ Power Licensing AG, Zug (CH)

(72) Inventor: Günther Bauer, Ottobrunn (DE)

(73) Assignee: IQ Power Licensing AG, Zug (CH)

( * ) Notice: Subject to any disclaimer, the term of this patent is extended or adjusted under 35 U.S.C. 154(b) by 0 days.

(21) Appl. No.: 14/148,250

(22) Filed: Jan. 6, 2014

(65) Prior Publication Data

US 2014/0115880 A1    May 1, 2014

Related U.S. Application Data

(63) Continuation of application No. 12/377,755, filed as application No. PCT/DE2007/001453 on Aug. 16, 2007, now abandoned.

(30) Foreign Application Priority Data

Aug. 16, 2006  (DE) .................. 10 2006 038 047

(51) Int. Cl.
*H01M 10/04* (2006.01)
*H01M 6/00* (2006.01)
*H01M 2/38* (2006.01)
*H01M 10/12* (2006.01)
*H01M 10/42* (2006.01)

(52) U.S. Cl.
CPC .......... *H01M 6/005* (2013.01); *Y10T 29/49108* (2015.01); *H01M 2/38* (2013.01); *H01M 10/12* (2013.01); *H01M 10/4214* (2013.01); *Y02E 60/126* (2013.01)

(58) Field of Classification Search
CPC ............ H01M 10/04; H01M 10/0463; H01M 10/0472
USPC ................. 429/51, 70, 81, 121–347
See application file for complete search history.

(56) References Cited

U.S. PATENT DOCUMENTS

| 3,988,165 | A | 10/1976 | Mao et al. |
| 4,221,847 | A | 9/1980 | Inkmann |
| 4,871,627 | A | 10/1989 | Strong et al. |
| 4,894,295 | A | 1/1990 | Cheiky |
| 4,963,444 | A | 10/1990 | Delaney |
| 5,032,476 | A | 7/1991 | Kirby |

(Continued)

FOREIGN PATENT DOCUMENTS

| DE | G 91 14 909.6 U1 | 1/1992 |
| DE | 297 18 004 U1 | 1/1998 |

(Continued)

*Primary Examiner* — Kenneth Douyette
*Assistant Examiner* — James Lee
(74) *Attorney, Agent, or Firm* — Henry M. Feiereisen LLC

(57) ABSTRACT

The invention relates to a method for making an electrolytic battery which is preferably used in movable facilities such as cars, boats and planes. The method comprises the following steps: inserting of intermixing plates 5a' into the battery case 1, one each at two sides thereof which are opposite to each other, inserting of the set of electrodes 2 between the two intermixing plates 5a' positioned in the battery case 1 and connecting of the two intermixing plates 5a' straightened out vertically with the bridging plate 5b' comprising a drain surface, which is slightly inclined towards the center thereof, and an opening provided approximately in the center thereof to enable electrolyte to flow back into the batter case.

3 Claims, 5 Drawing Sheets

(56) References Cited

U.S. PATENT DOCUMENTS

| | | |
|---|---|---|
| 5,096,787 A | 3/1992 | Delaney |
| 5,776,208 A | 7/1998 | Mieda |
| 2002/0028373 A1* | 3/2002 | Tschirch .................. 429/81 |
| 2005/0058899 A1 | 3/2005 | Rivetta |

FOREIGN PATENT DOCUMENTS

| | | |
|---|---|---|
| WO | WO 95/15586 | 6/1995 |
| WO | WO 99/19923 | 4/1999 |

* cited by examiner

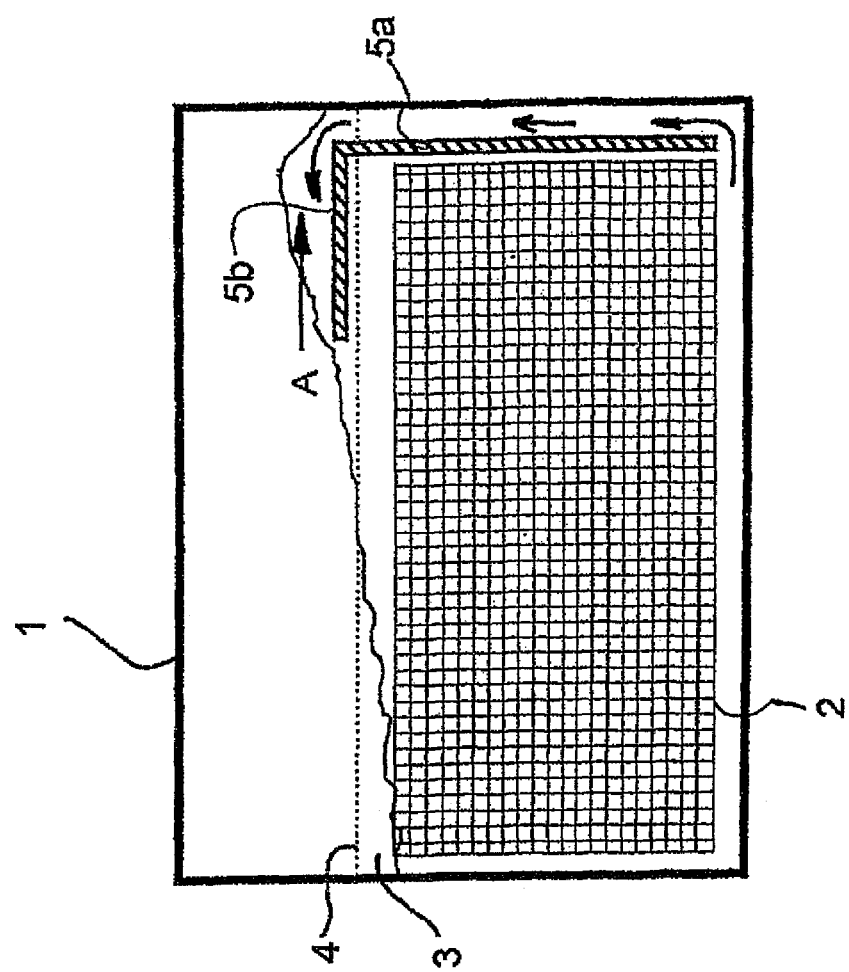

View A-A

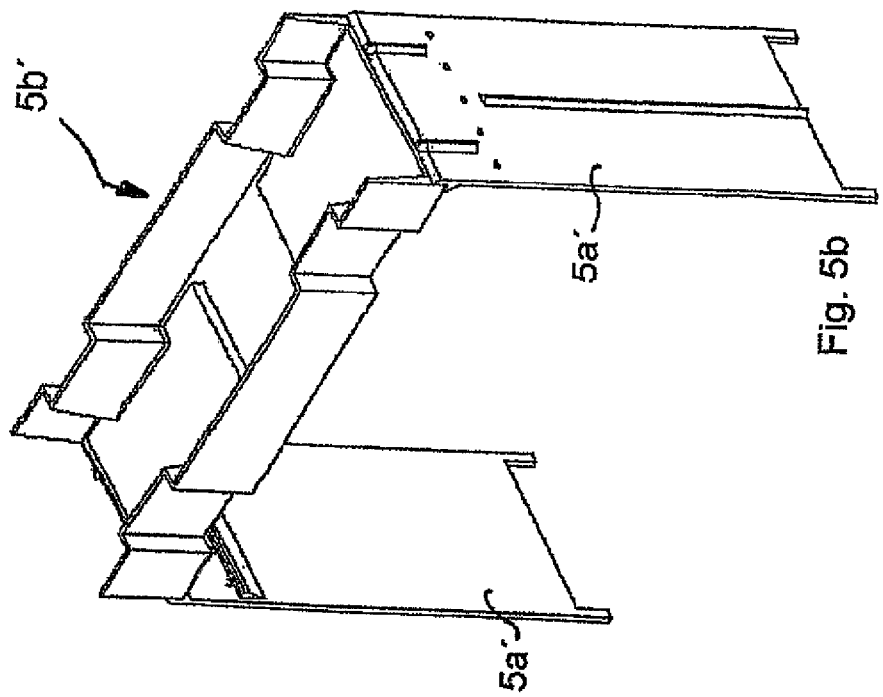
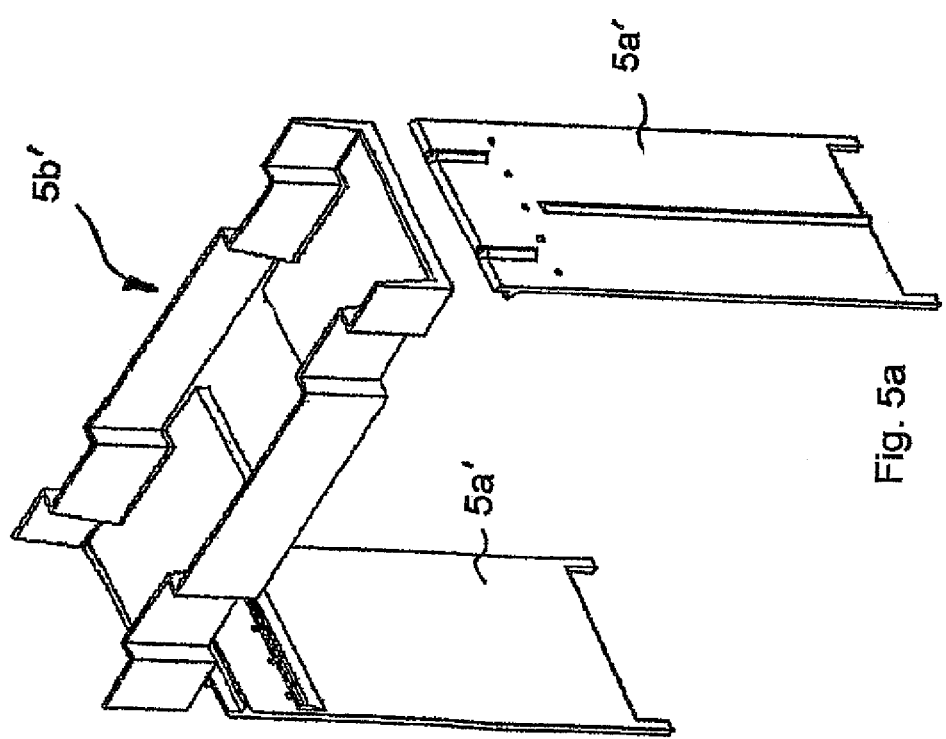

METHOD FOR PRODUCING A LIQUID ELECTROLYTE BATTERY

CROSS-REFERENCES TO RELATED APPLICATIONS

This application is a continuation of prior filed copending U.S. application Ser. No. 12/377,755, filed Jan. 21, 2011, the priority of which is hereby claimed under 35 U.S.C. §120, which in turn is the National Stage of International Application No. PCT/DE2007/001453, filed Aug. 16, 2007, which designated the United States and has been published as International Publication No. WO 2008/019676 and claims the priority of German Patent Application, Ser. No. 10 2006 038 047.9, filed Aug. 16, 2006, pursuant to 35 U.S.C. 119(a)-(d), the contents of which are incorporated herein by reference in its entirety as if fully set forth herein.

BACKGROUND OF THE INVENTION

The invention relates to a method for making an electrolytic battery which is preferably used in movable facilities such as cars, boats and planes.

The endeavor of car industry for weight-saving constructions also includes a reduction of battery weight. At the same time, there is the demand for increasing the battery performance in order to provide enough energy for starting a vehicle and for operating additional units such as electrical window lifters, seat-adjusting devices and seat heaters. Furthermore, there is the demand for keeping the performance of a battery at an almost constant high level during the lifetime thereof.

Several measures to increase the performance of such a conventional lead-acid battery are known from prior art. The performance of battery is understood to be the capability thereof to supply and receive a current.

A great problem occurring with lead-acid batteries is to utilize the total surfaces of electrodes almost completely. When the acid concentration in an area of the surface of electrode is too high, the electrodes are subjected to corrosion and are decomposed. When the acid concentration is too low, there is a lack of electrolytic properties so that a battery does not work reliably. Due to certain effects known from prior art, the density of acid is uneven within a battery. In order to eliminate this deficiency, devices for intermixing the electrolyte were developed. Such devices also prevent that depositions affecting the function and life of a battery are formed.

Document DE U 9114909 discloses an accumulator battery, the electrolyte of which being circulated by introducing pressurized gas into it. However, this method of circulation is suited for car batteries restrictedly only, because the circulation device has a very complex structure and a pressure-gas source is required. Devices for intermixing the electrolyte, which are called hydrostatic pumps, are known from prior art. In the following, the function of such devices is described. When a vehicle is moved at an even speed, i.e., when it is whether accelerated nor decelerated, the surface of liquid electrolyte in the battery is smooth and leveled. When a car is accelerated or decelerated, the electrolyte is pushed back and forth, due to its mass moment of inertia. Flows of electrolyte arising from such movements are guided through channels and barriers so that an intermixing is gained as good as possible.

This principle representing the closest of prior art is described in the documents U.S. Pat. No. 4,963,444, U.S. Pat. No. 5,096,787, U.S. Pat. No. 5,032,476 and the German utility model 297 18004.5, among others. Object of the closest of prior art is an angle-shaped intermixing device arranged between the electrodes and one of the side walls of a battery case, as shown in FIG. 1.

Conventionally, when a battery with or without an intermixing device is manufactured, the first step is to insert the set of electrodes 2 into the empty case intermixing device arranged between the electrodes and one of the side walls of a battery case, as shown in FIG. 1.

Conventionally, when a battery with or without an intermixing device is manufactured, the first step is to insert the set of electrodes 2 into the empty case thereof. When a battery is to be equipped with an intermixing device, the set of electrodes has to be positioned exactly so that the gap between its vertical edge and the side wall of battery at one side thereof has the same width as that on the opposite side. However, this can be realized under difficult condition only, because the massive set of electrodes has to be inserted manually, due to the fact, that using of a robot or a similar handling device would be too expensive.

The electrode plates are protected by a foil made of plastic material, which is mechanically very sensitive and hereinafter called electrode bag. Inserting of an angle-shaped mixing plate into the gap between the vertical edge of each of the electrode plates and the side wall at the right side and the left side of battery must be done very carefully to prevent the electrode bags from being damaged. Damaged electrode bags would lead to a premature breakdown of the respective battery cell and thus, to a reduced capacity of battery.

With the case shown in FIG. 2, the set of electrodes is positioned so that the gap between the vertical edge of each of the electrode plates and the side wall at the left side of battery is smaller than that at the right side.

Another disadvantage of the conventional production process is schematically represented in FIG. 3a. When the set of electrode plates is incorrectly positioned as shown in FIG. 3a, the flow channel formed between the vertical leg of the mixing plate and the side wall at the right side of battery has a smaller depth than that at the left side. However, as the flow channels are optimized with regard to the depth, any change of depth inevitably leads to a reduction of efficiency of intermixing. With the case shown in FIG. 3b, the depth of the left-sided flow channel is the same as that of the right-sided one so that an effective intermixing takes place, as indicated by arrows.

Still another harmful disadvantage of this production technology is that any damage of electrode bags can not be found out when the battery is under final inspection. Therefore, damaging of electrode bags must be prevented unconditionally. On the other hand, this step of assembling may not cause higher cost. Therefore, it is necessary to look for a simple, but nevertheless, to a reliable solution. Thus, object of the invention is to eliminate the deficiency occurring with the prior art. Especially, damaging of electrode bags shall be avoided.

This object is solved by a method for making electrolytic batteries having an intermixing device, as defined in claim 1.

This method comprises the following steps:

Inserting of one intermixing plate each manually at two predetermined side walls of battery case, which are opposite to each other, wherein the intermixing plates are inserted slightly inclined, i.e., with this method, the angle-shaped intermixing plates according to the prior art are composed of a vertical and a horizontal portion. Hereinafter, the vertical portion is called intermixing plate. Dependent on the type of construction of a battery, the intermixing plates are positioned in the battery case under an angle of about 10 to 20 degrees.

Inserting of the set of electrodes between the two intermixing plates positioned in the battery case, which thereby are pushed to a vertical position, i.e., when the set of electrodes is inserted into the battery case manually, the intermixing plates are shifted or pushed to the predetermined vertical position. As the intermixing plates are light and smooth, there is no danger that the electrode bags are damaged during this procedure. In addition, when the set of electrodes is inserted manually, it is shifted to the correct position by the intermixing plates serving as centering means. Placing a bridging plate horizontally onto the two intermixing plates straightened out vertically.

These technological steps of making batteries enable advantage to be gained as follows.

As the intermixing plates of the divided intermixing device are inserted before the set of electrodes is positioned between them, damaging of the sensitive electrode bags can be prevented, largely. This is an auto-centering process, which can further be supported when the battery case is placed on a conveyor having small rolls.

In addition, with the manufacturing method according to the invention, the electrode plates are exactly positioned by means of the intermixing plates arranged at two sides of the battery case. This is advantageous in that the electric terminals of all of the electrode plates are exactly aligned to each other. Thereafter, the terminals are connected with each other by a welding robot so that the battery cells are connected in series. Up to now, the terminals had to be relatively wide to enable them to be welded together even if they are not aligned exactly. According to the invention, the electrode plates are exactly aligned to each other so that there are no great tolerances to be compensated and the size of terminals can be reduced without affecting the accuracy of welding process. Due to the smaller terminals, about 200 g and more of lead can be saved per battery.

As soon as the intermixing plates and the electrode plates are inserted and vertically aligned, the bridging plate is placed onto the intermixing plates and connected with them at right angles to form a compact intermixing assembly. When placed onto the intermixing plates, the bridging plate contributes to equalize deformations of battery case caused with injection molding and to reinforce the battery case as a whole. Compared with the prior art, another advantage of the invention is that the upper surface of bridging plate serving as drain surface for the electrolyte is inclined by a predetermined angle from both end sides towards the center thereof, wherein the inclination is not changed when the bridging plate and the cover of battery are mounted and is almost independent on manufacturing tolerances of battery case so that an optimum intermixing effect is gained. Below, the production method according to the invention will be described in more detail by means of the accompanying drawings.

FIG. 1 is a side view of a lead-acid battery according to the prior art, which is provided with an angle-shaped intermixing plate.

FIG. 5 (5a, 5b) is a perspective view of a bridging plate.

Figure 2A:
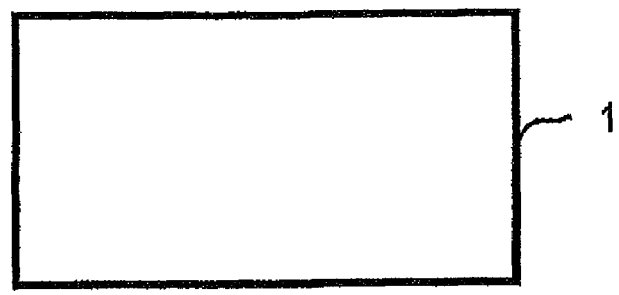
FIG. 2 (2a-2c) shows a step of a production process according to the prior art.

Now, the invention will be explained by means of FIGS. 4 and 5, with the prior art shown in FIGS. 1 to 3 included.

FIG. 1 shows a battery case 1 with a lead electrode 2 and a filling of acid 3, the level of which being denoted by mark 4, when the battery is in the state of rest. The angle-shaped intermixing device comprises a vertical leg 5a and a horizontal leg 5b. For example, when such a battery is installed in car and the car moving in a direction indicated by an arrow A is decelerated, the acid between the vertical leg 5a and the side wall of battery case is pushed upwardly and drains along the horizontal leg 5b. As this procedure takes place repeatedly, intermixing of acid is gained as wanted. In FIG. 1, the intermixing device is represented at one side of battery case 1 only.

Figure 2B:
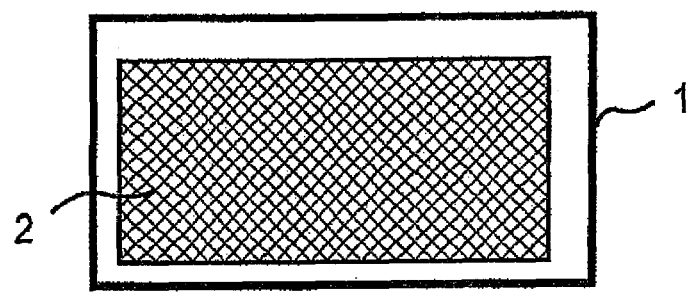
Figure 2C:
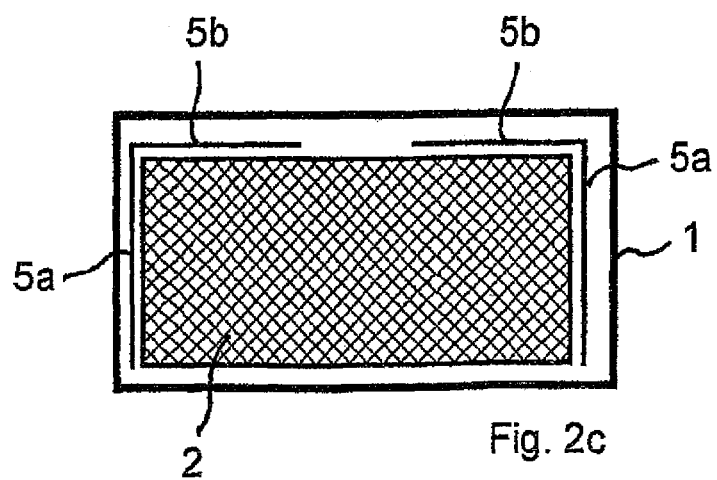

FIG. 2 shows steps of manufacturing of such a conventional battery. At first, the set of lead electrodes 2 is inserted into the empty battery case 1. With this procedure, there is the possibility that the set of electrodes is not positioned centrally, as shown in FIG. 2b. The next step is to insert one angle-shaped intermixing plate 5a, 5b each at both sides of battery case, as shown in FIG. 2c. As the set of electrodes 2 is positioned too close to the left side wall of battery, there is the possibility that the jackets made of plastic material and protecting the electrodes are damaged. Such a damage will inevitably lead to a premature breakdown of the respective battery cell and the battery as a whole.

Figure 3A:
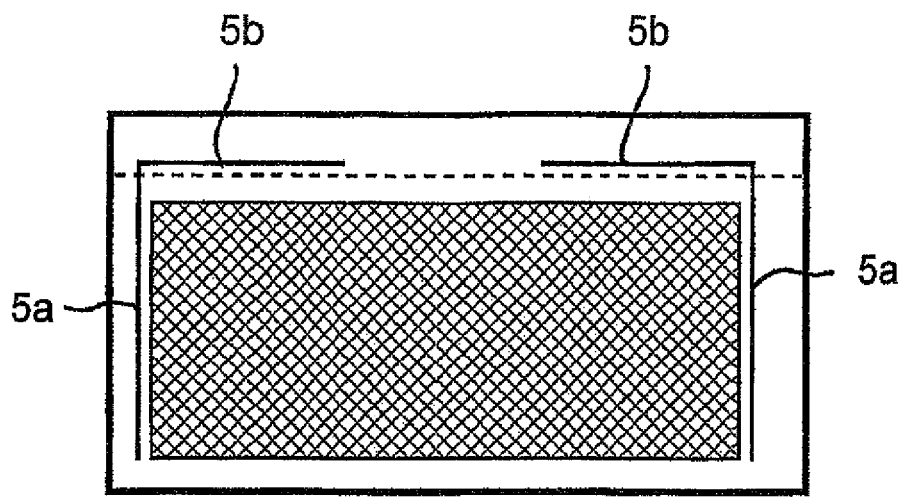
FIG. 3 (3a, 3b) shows a functional comparison between the prior art and the invention.
Figure 3B:
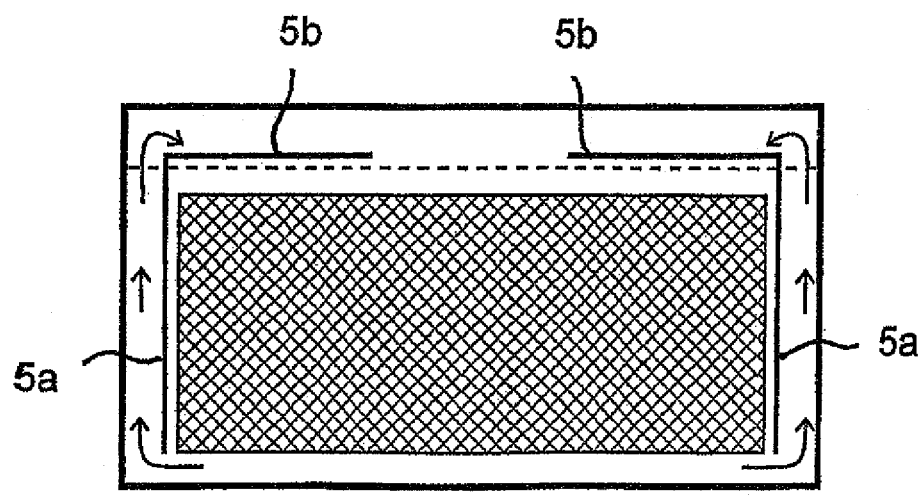
Figure 4A:
FIG. 4 (4a-4d) shows assembling steps according to the invention.
Figure 4B:
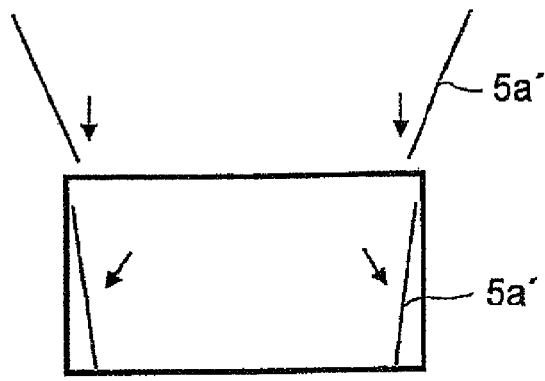
Figure 4C:
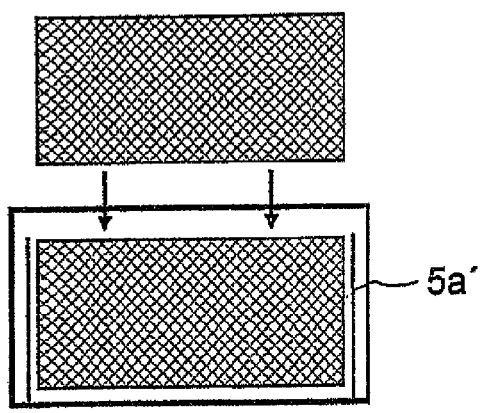
Figure 4D:
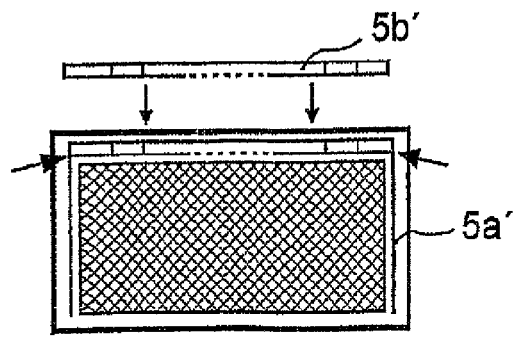

FIG. 3a shows schematically another disadvantage of a conventional production method. When the set of electrodes is not exactly positioned, the two flow channels, each of which being formed between the respective side wall and the vertical leg of the respective angle-shaped intermixing plate, are different in depth. However, as the flow channels are optimized with regard to the depth, any change of depth will lead to a reduction of efficiency of intermixing. As shown in FIG. 3b, the left-sided flow channel and the right-sided flow channel are equal in depth so that an efficient intermixing takes place, indicated by arrows.

FIG. 4 shows schematically steps of the production method according to the invention. A novel intermixing device is used here, which is composed of three elements, i.e. two intermixing plates 5a' and a bridging plate 5b'. At first, the two intermixing plates 5a' are inserted into the battery case 1 each under a small angle to a corresponding vertical plane so that a horizontal distance between the two intermixing plates in a direction which is perpendicular to the vertical planes reduces downwardly (FIG. 4b). Thereafter, the set of electrodes 2 is inserted and push the two intermixing plates 5a' to vertical positions (FIG. 4c). This enables the set of electrodes 2 to be positioned centrally in the battery case 1. In the final step the bridging plate 5b' is placed horizontally on the intermixing plates 5' straightened up vertically (FIG. 4d).

FIGS. 5a and 5b show perspective views of the two intermixing plates 5a' and the bridging plate 5b', wherein FIG. 5a is a explosive and perspective view of the intermixing device and FIG. 5b is a perspective view of the assembled intermixing device. It must be emphasized that the inventive method is also suited for making electrolytic batteries equipped with an intermixing device different in shape from that shown in the figures, as it is the case with batteries used in trucks.

What is claimed is:

1. A method for making a lead-acid battery having an intermixing device, comprising:
    inserting two intermixing plates into a battery case at two sides of the battery case opposite to each other at angles to corresponding vertical planes with a horizontal distance between the inserted intermixing plates in a direction which is perpendicular to the vertical planes reducing downwardly,
    inserting a set of electrodes between the two intermixing plates positioned in the battery case and thereby straightening the intermixing plates so that they extend vertically;

dimensioning the battery case, the set of electrodes, and the intermixing plates so that the set of electrodes is moved in a constructively predetermined position and thus, flow channels having a predetermined cross section are formed; and connecting the two intermixing plates straightened out vertically with a bridging plate having a drain surface inclined towards a center thereof and an opening provided approximately in the center thereof to enable electrolyte to flow back into the battery case.

2. The method according to claim 1, further comprising connecting the bridging plate with the intermixing plates by plug-in elements or clips.

3. The method according to claim 1, further comprising supporting the battery case by a small-roller conveyor when the set of electrodes is inserted.

* * * * *